United States Patent
Sugiura et al.

(10) Patent No.: US 10,199,681 B2
(45) Date of Patent: Feb. 5, 2019

(54) SULFIDE SOLID ELECTROLYTE MATERIAL, LITHIUM SOLID BATTERY AND METHOD OF PREPARING SULFIDE SOLID ELECTROLYTE MATERIAL

(71) Applicants: Koichi Sugiura, Susono (JP); Shigenori Hama, Sunto-gun (JP); Miwako Ohashi, Mishima (JP)

(72) Inventors: Koichi Sugiura, Susono (JP); Shigenori Hama, Sunto-gun (JP); Miwako Ohashi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 608 days.

(21) Appl. No.: 14/654,916

(22) PCT Filed: Dec. 18, 2013

(86) PCT No.: PCT/IB2013/002795
§ 371 (c)(1),
(2) Date: Jun. 23, 2015

(87) PCT Pub. No.: WO2014/102580
PCT Pub. Date: Jul. 3, 2014

(65) Prior Publication Data
US 2015/0349377 A1    Dec. 3, 2015

(30) Foreign Application Priority Data
Dec. 27, 2012  (JP) ................. 2012-284233

(51) Int. Cl.
*H01M 10/00* (2006.01)
*H01M 10/0562* (2010.01)
*C03C 3/32* (2006.01)
*H01M 10/052* (2010.01)
*H01M 10/0585* (2010.01)
*C03C 4/14* (2006.01)

(52) U.S. Cl.
CPC ........ *H01M 10/0562* (2013.01); *C03C 3/323* (2013.01); *C03C 4/14* (2013.01); *H01M 10/052* (2013.01); *H01M 10/0585* (2013.01); *H01M 2300/0068* (2013.01)

(58) Field of Classification Search
CPC ........... H01M 10/052; H01M 10/0585; H01M 10/0562; H01M 2300/0068; C03C 3/323; C03C 4/14
See application file for complete search history.

(56) References Cited

U.S. PATENT DOCUMENTS

| | | |
|---|---|---|
| 2007/0196739 A1 | 8/2007 | Seino et al. |
| 2010/0200795 A1* | 8/2010 | Ota .............. H01M 10/052 252/62.2 |

(Continued)

FOREIGN PATENT DOCUMENTS

| | | |
|---|---|---|
| CN | 102388420 A | 3/2012 |
| EP | 2 211 415 A1 | 7/2010 |

(Continued)

*Primary Examiner* — Nicholas P D'Aniello
(74) *Attorney, Agent, or Firm* — Oliff PLC (57) ABSTRACT

A sulfide solid electrolyte material exhibiting Li ion conductivity contains an organic compound having a molecular weight within a range of 30 to 300, wherein the organic compound has a content of 0.8 wt % or less.

8 Claims, 3 Drawing Sheets (56) References Cited

U.S. PATENT DOCUMENTS

| | | |
|---|---|---|
| 2011/0108642 A1 | 5/2011 | Hama et al. |
| 2012/0009484 A1 | 1/2012 | Aburatani et al. |
| 2013/0164631 A1* | 6/2013 | Ohtomo ............ H01M 10/0525 |
| | | 429/319 |
| 2014/0004257 A1 | 1/2014 | Kubo et al. |
| 2014/0141339 A1 | 5/2014 | Sugiura et al. |

FOREIGN PATENT DOCUMENTS

| | | |
|---|---|---|
| JP | H07-330312 A | 12/1995 |
| JP | 2008-004459 A | 1/2008 |
| JP | 2010-250981 A | 11/2010 |
| JP | 2012-199003 A | 10/2012 |
| JP | 2012-212652 A | 11/2012 |
| JP | 2013-020894 A | 1/2013 |
| JP | 2013-155087 A | 8/2013 |
| WO | 2005/040039 A1 | 5/2005 |
| WO | 2012/026238 A1 | 3/2012 |
| WO | 2012/026561 A2 | 3/2012 |

* cited by examiner

SULFIDE SOLID ELECTROLYTE MATERIAL, LITHIUM SOLID BATTERY AND METHOD OF PREPARING SULFIDE SOLID ELECTROLYTE MATERIAL

BACKGROUND OF THE INVENTION

1. Field of the Invention

The present invention pertains to a sulfide solid electrolyte material exhibiting high Li ion conductivity, a lithium solid battery and a method of preparing the sulfide solid electrolyte material.

2. Description of Related Art

With recent rapid prevalence of information related devices and communication devices such as PC, video camera and mobile phone, it is getting important to develop batteries utilized as their energy sources. Besides, in vehicle industry and the like, development of batteries for electric vehicles and hybrid vehicles has proceeded to achieve high output and high capacity. Among various batteries, lithium battery has currently been attracting in terms of its high energy density.

Lithium battery currently commercially available to us includes an electrolyte liquid containing a flammable organic solvent, and needs to be modified in terms of safety device attachment for preventing the rise in temperature resulting from short circuit, and in terms of structure and material for preventing short circuit. Meanwhile, lithium battery entirely composed of solid batteries with a solid electrolyte layer modified from the electrolyte liquid does not necessitate the flammable organic solvent, making it possible to simplify a safety device and achieve superior fabrication cost and productivity. Sulfide solid electrolyte material has been known as a solid electrolyte material used for such a solid electrolyte layer.

Sulfide solid electrolyte material exhibits high. Li ion conductivity and can be utilized for achieving high output of battery, and has been studied from various aspects so far. For example, Japanese Patent Application Publication No. 2008-004459 (JP 2008-004459 A) discloses that dehydrated toluene is added into the mixture of $Li_2S$ and $P_2S_5$ prior to performing wet mechanical milling.

For example, internal resistance of battery needs to be lowered for improving input and output of the battery. In particular, in a whole solid battery, it is important to reduce a resistance (direct current resistance and diffusion resistance) between solid electrolyte materials. These resistances are highly susceptible to Li ion conductivity of solid electrolyte material. In view of the above backgrounds, sulfide solid electrolyte material exhibiting high Li ion conductivity is required.

SUMMARY OF THE INVENTION

The present invention provides a sulfide solid electrolyte material exhibiting high Li ion conductivity, a lithium solid battery and a method of preparing the sulfide solid electrolyte material.

The first aspect of the present invention relates to a sulfide solid electrolyte material exhibiting Li ion conductivity. The sulfide solid electrolyte material includes an organic compound having a molecular weight within a range of 30 to 300. The content of the organic compound is 0.8 wt % or less based on the amount of the sulfide solid electrolyte material.

The sulfide solid electrolyte material containing a very small amount of the organic compound exhibits high Li ion conductivity.

The content of the organic compound may be 0.2 wt % or more based on the amount of the sulfide solid electrolyte material.

The sulfide solid electrolyte material may contain S element, Li element and at least one of elements selected from a group consisting of P, Si, Ge, Al and B.

The sulfide solid electrolyte material may further contain a halogen element.

The second aspect of the present invention relates to a lithium solid battery which includes a positive electrode active substance layer containing a positive electrode active substance, a negative electrode active substance layer containing a negative electrode active substance, and a solid electrolyte layer formed between the positive electrode active substance layer and the negative electrode active substance layer. At least one of the positive electrode active substance layer, the negative electrode active substance layer and the solid electrolyte layer contains the sulfide solid electrolyte material mentioned above.

With use of the sulfide solid electrolyte material mentioned above, it is possible to provide a lithium solid battery exhibiting high Li ion conductivity. Therefore, it is possible to achieve a high output of the battery.

The third aspect of the present invention relates to a method of preparing the sulfide solid electrolyte material mentioned above. The preparation method includes an amorphization step of performing mechanical milling to a mixture of a raw material composition and the above organic compound to convert the raw material composition to an amorphous state, thereby a sulfide glass is synthesized; and a drying step of drying the sulfide glass with the organic compound remaining.

It is possible to obtain a sulfide solid electrolyte material exhibiting high Li ion conductivity by drying the sulfide glass with the organic compound remaining.

In the present invention, it is possible to obtain the sulfide solid electrolyte material exhibiting a high Li ion conductivity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereafter, a sulfide solid electrolyte material, a lithium solid battery and a method of preparing the sulfide solid electrolyte material will be described in detail.

A. Sulfide Solid Electrolyte Material

First, the sulfide solid electrolyte material according to an embodiment of the present invention will be described. The sulfide solid electrolyte material is a sulfide solid electrolyte material exhibiting a high Li ion conductivity, and contains an organic compound having a molecular weight within a range of 30 to 300, in which the content of the organic compound is 0.8 wt % or less.

According to the embodiment, the sulfide solid electrolyte material contains a very small amount of the organic compound, making it possible to provide the sulfide solid electrolyte material exhibiting high Li ion conductivity. Herein, material property is important for improvement of the Li ion conductivity of the sulfide solid electrolyte material. Besides, the prevention of impurity contamination is also important. In particular, a low molecular weight organic compound utilized for synthesis, process and the like of the sulfide solid electrolyte material may cause prevention of Li ion conductivity physically, when remaining in the sulfide solid electrolyte material. For this reason, sufficient drying is generally made to remove the organic compound after performing wet mechanical milling as disclosed in JP 2008-004459 A. Meanwhile, the inventors focus on residual organic compound through their intensive researches, revealing that the sulfide solid electrolyte material containing very small amount of the residual organic compound exhibits a high Li ion conductivity, unexpectedly, compared to the battery not containing the residual organic compound impurity at all, presumably due to large springback between particles of the solid electrolyte material in press-molding which negatively affects formation of interface between the particles. As described above, in the present invention, the very small amount of residual organic compound is proved to contribute to improvement of Li ion conductivity, unexpectedly. Hereafter, the sulfide solid electrolyte material according to the embodiment will be described for each component.

1. Organic Compound

The sulfide solid electrolyte material according to the embodiment contains very small amount of low molecular weight organic compound. The very small amount of the residual compound contributes to improvement of the Li ion conductivity. The organic compound is generally liquid at 25° C. Molecular weight of the organic compound is generally 30 or more, and preferably 60 or more. When molecular weight of the organic compound is too small, the organic compound may not sufficiently serve as a dispersion material, in preparation of the sulfide solid electrolyte material, for example. Meanwhile, molecular weight of, the organic compound is generally 300 or less, and preferably 200 or less. When molecular weight of the organic compound is too large, it may be difficult to eliminate the organic compound in preparation of the sulfide, solid electrolyte material, for example.

The organic compound is preferably aprotic for prevention of hydrogen sulfide generation. Aprotic organic solvent is generally classified into polar aprotic organic compound and non-polar aprotic organic compound.

Polar aprotic organic compound is not limited to a particular one, and exemplified by ketone such as acetone, nitrile such as acetonitrile, amido such as N,N-dimethylformamide (DMF) and sulfoxide such as dimethyl sulfoxide (DMSO).

Non-polar aprotic organic compound is not limited to a particular one, and exemplified by alkane which is liquid at 25° C. The alkane may be straight-chain alkane, branched-chain alkane or cyclic alkane. The carbon number of the straight-chain alkane and branched-chain alkane is preferably 5 or more, for example. Meanwhile, the maximum of the carbon number of the straight-chain alkane and branched-chain alkane is not limited to a particular one, as long as the straight-chain alkane and branched-chain alkane are liquid at ordinary temperature. The specific example of the straight-chain alkane and branched-chain alkane is pentane, hexane, heptane, octane, nonane, decane, undecane, dodecane, paraffin and so on. Meanwhile, the cyclic alkane is exemplified by cyclopentane, cyclohexane, cycloheptane, cyclooctane, and cycloparaffin.

In addition, other examples of non-polar aprotic organic compound are aromatic hydrocarbon such as benzene, toluene, xylene, straight-chain ether and branched-chain ether such as diethylether and dimethylether, cyclic ether such as tetrahydrofuran, halogenated alkyl such as chloroform, methyl chloride, methylene chloride, ester such as ethyl acetate, fluorine compound such as benzene fluoride, heptane fluoride.

According, to this embodiment, the content of the organic compound is generally 0.8 wt % or less, and preferably 0.65 wt % or less based on the amount of the sulfide solid electrolyte material. When the content is too large, the organic compound may physically prevent Li ion conductivity. Meanwhile, the content of the organic compound is 0.2 wt % or more, for example, and preferably 0.4 wt % or more based on the amount of the sulfide solid electrolyte material. When the content is too small, springback described above may bring negative effects. The content of the organic compound is determined based on thermal desorption GC/MS analysis after heating of the organic compound and collecting the gas component into an adsorption tube.

2. Sulfide Solid Electrolyte Material

The sulfide solid electrolyte material according to this embodiment has Li ion conductivity, and contains at least Li and S elements. In particular, the sulfide solid electrolyte material according, to this embodiment preferably contains A element (A represents at least one of P, Si, Ge, Al and B), in addition to Li and S elements. In this instance, the sulfide solid electrolyte material contains an ion conductor composed of Li, A and S elements.

The ion conductor preferably has ortho composition or a similar composition, for example, for providing a sulfide solid electrolyte material with high chemical stability. Herein, ortho generally refers to the oxo acid with the highest degree of hydration obtained from hydration of the same oxide. In this specification, ortho composition refers to a crystal composition with the highest number of added $Li_2S$ among sulfides. For example, $Li_3PS_4$ corresponds to ortho composition in $Li_2S$—$P_2S_5$ system, $Li_4SiS_4$ corresponds to ortho composition in $Li_2S$—$SiS_2$ system, $Li_4GeS_4$ corresponds to ortho composition in $Li_2S$—$GeS_2$ system, $Li_3AlS_3$ corresponds to ortho composition in $Li_2S$—$Al_2S_3$ system, and $Li_3BS_3$ corresponds to ortho composition in $Li_2S$—$B_2S_3$ system. Specifically, the ion conductor preferably contains an anion structure with ortho composition ($PS_4^{3-}$ structure, $SiS_4^{4-}$ structure, $GeS_4^{4-}$ structure, $AlS_3^{3-}$ structure, $BS_3^{3-}$ structure) as a main component. The content ratio of the anion structure with ortho composition is preferably 60 mol % or more with respect to that of entire anion structure of the ion conductor, more preferably 70 mol % or more, further preferably 80 mol % or more, and particularly preferably 90 mol % or more. The content ratio of the anion structure with ortho composition can be determined based on raman spectroscopy, NMR, XPS and the like.

Preferably, the ion conductor does not substantially contain $Li_2S$, for providing a sulfide solid electrolyte material with small amount of generated hydrogen sulfide. $Li_2S$ can react with water to generate hydrogen sulfide. For example, the more content of $Li_2S$ in the raw material composition causes $Li_2S$ to be easily residual. The property, "$Li_2S$ is not substantially contained", can be proved by X-ray diffraction.

Specifically, the absence of $Li_2S$ peaks ($2\theta=27.0°$, $31.2°$, $44.8°$ and $53.1°$) can prove that $Li_2S$ is not substantially contained.

Preferably, the ion conductor does not substantially contain bridged sulfur; for providing a sulfide solid electrolyte material with small amount of generated hydrogen sulfide. The "bridged sulfur" refers to bridged sulfur in the compound obtained from a reaction between $Li_2S$ and the sulfide compound containing the above A element(s). For example, bridged sulfur in $S_3P$—S—$PS_3$ structure obtained from a reaction between $Li_2S$ and $P_2S_5$ corresponds to the "bridged sulfur". Such bridged sulfur easily reacts with water to generate hydrogen sulfide. In addition, the property, "bridged sulfur is not substantially contained", can be proved by raman spectroscopy. For example, $Li_2S$—$P_2S_5$ system ion conductor generally gives peaks of $S_3P$—S—$PS_3$ structure at 402 $cm^{-1}$. For this reason, such a peak is not observed, preferably. Meanwhile, $PS_4^{3-}$ structure gives a peak at 417 $cm^{-1}$. According to this embodiment, intensity $I_{402}$ at 402 $cm^{-1}$ is preferably smaller than intensity $I_{417}$ at 417 $cm^{-1}$. More specifically, the intensity $I_{402}$ is preferably 70% or less with respect to the strength $I_{417}$, for example, more preferably 50% or less, and further preferably 35% or less. The ion conductor other than $Li_2S$—$P_2S_5$ system can be analyzed by specifying a unit including bridged sulfur and measuring peaks for the unit to prove that the bridged sulfur is substantially not contained.

The sulfur solid electrolyte material according to this embodiment preferably contains X element (X represents halogen) in addition to Li, A and S elements, for providing the sulfur solid electrolyte material with high Li ion conductivity. In particular, when the raw material composition contains LiI, LiI is presumed to be at least partly incorporated within an ion conductor (e.g., $Li_3PS_4$) other than LiI. Specifically, X element is exemplified by F, Cl, Br and I. X is preferably Cl, Br or I.

The sulfur solid electrolyte material according to this embodiment is preferably formed of a raw material composition containing Li element, A element (A represents at least one of P, Si, Ge, Al and B), and S element.

The raw material composition preferably contains Li containing compound as Li element. Li containing compound is exemplified by lithium sulfide ($Li_2S$). The amount of impurity is preferably small in $Li_2S$, for suppressing side reactions. $Li_2S$ synthesis method is exemplified by a method described in Japanese Patent Application Publication No. 7-330312 (JP 7-330312 A). Furthermore, $Li_2S$ synthesis method is preferably purified by a method described in International Publication WO 2005/040039.

The raw material composition may contain an A element containing compound or A element itself as an A element. The A element containing compound can be exemplified by a sulfide of A element, specifically $P_2S_3$, $P_2S_5$, $SiS_2$, $GeS_2$, $Al_2S_3$, $B_2S_3$ and the like. The raw material composition may contain an S containing compound or S itself as S element. The S-containing compound can be exemplified by sulfides described above, for example.

In the $Li_2S$—$P_2S_5$ sulfide solid electrolyte material, a molar ratio of $Li_2S$ to $P_2S_5$ is 75 to 25 for achieving ortho composition. This molar ratio can be applied for $Li_2S$—$Al_2S_3$ sulfide solid electrolyte material and $Li_2S$—$B_2S_3$ sulfide solid electrolyte material. In the $Li_2S$—$SiS_2$ sulfide solid electrolyte material, a molar ratio of $Li_2S$ to $SiS_2$ is 66.7 to 33.3 for achieving ortho composition. This molar ratio can be applied for $Li_2S$—$GeS_2$ sulfide solid electrolyte material.

When the raw material composition contains $Li_2S$ and $P_2S_5$, the ratio of $Li_2S$ is preferably within a range of 70 mol % to 80 mol %, more preferably within a range of 72 mol % to 78 mol %, and further preferably within a range of 74 mol % to 76 mol %, based on the total amount of $Li_2S$ and $P_2S_5$. This molar ratio can be applied for a raw material composition containing $Li_2S$ and $Al_2S_3$, and a raw material composition containing $Li_2S$ and $B_2S_3$. When the raw material composition contains $Li_2S$ and $SiS_2$, the ratio of $Li_2S$ is preferably within a range of 62.5 mol % to 70.9 mol %, more preferably within a range of 63 mol % to 70 mol %, and further preferably within a range of 64 mol % to 68 mol %, based on the total amount of $Li_2S$ and $SiS_2$. This molar ratio can be applied for a raw material composition containing $Li_2S$ and $GeS_2$.

Preferably, the raw material composition further contains LiX (X represents halogen). X in LiX represents halogen, and can be specifically exemplified by F, Cl, Br and I. X is preferably Cl, Br or I, for providing the sulfide solid electrolyte material exhibiting high ion conductivity. The ratio of LiX is preferably within a range of 1 mol % to 60 mol %, for example, more preferably within a range of 5 mol % to 50 mol %, further preferably within a range of 10 mol % to 40 mol %, and particularly preferably within a range of 10 mol % to 30 mol %.

The sulfide solid electrolyte material according to this embodiment may be a sulfide glass or a glass ceramics (crystallized sulfide glass). The sulfide glass refers to a material synthesized by amorphization of the raw material composition. The sulfide glass includes all materials synthesized by amorphization using mechanical milling or the like described below, as well as a "glass" in the strict sense having a crystal in which periodical structure is not observed by X-ray diffraction measurement or the like. The sulfide glass includes a material synthesized by amorphization, irrespective of whether peaks derived from the raw material (e.g., LiI or the like) are observed by X-ray diffraction measurement. The glass ceramic refers to a material prepared by crystallization of sulfide glass. X-ray diffraction method or the like can prove the presence of glass ceramics.

The shape of the sulfide solid electrolyte material according to this embodiment can be exemplified by particle-like shape. An average particle diameter ($D_{50}$) of the particle-like sulfide solid electrolyte material is preferably within a range of 0.1 μm to 50 μm. The sulfide solid electrolyte material preferably exhibits high Li ion conductivity, and has a Li ion conductivity of $1 \times 10^{-4}$ S/cm or more, for example, in ordinary temperature.

B. Lithium Solid Battery

Next, explanations will be given as to the lithium solid battery according to the embodiment of the present invention. The lithium solid battery includes a positive electrode active substance layer containing a positive electrode active substance, a negative electrode active substance layer containing a negative electrode active substance, and a solid electrolyte layer formed between the positive electrode active substance layer and the negative electrode active substance layer. The above sulfide solid electrolyte material is contained in at least one of the positive electrode active substance layer, the negative electrode active substance layer and the solid electrolyte layer.

Figure 1:
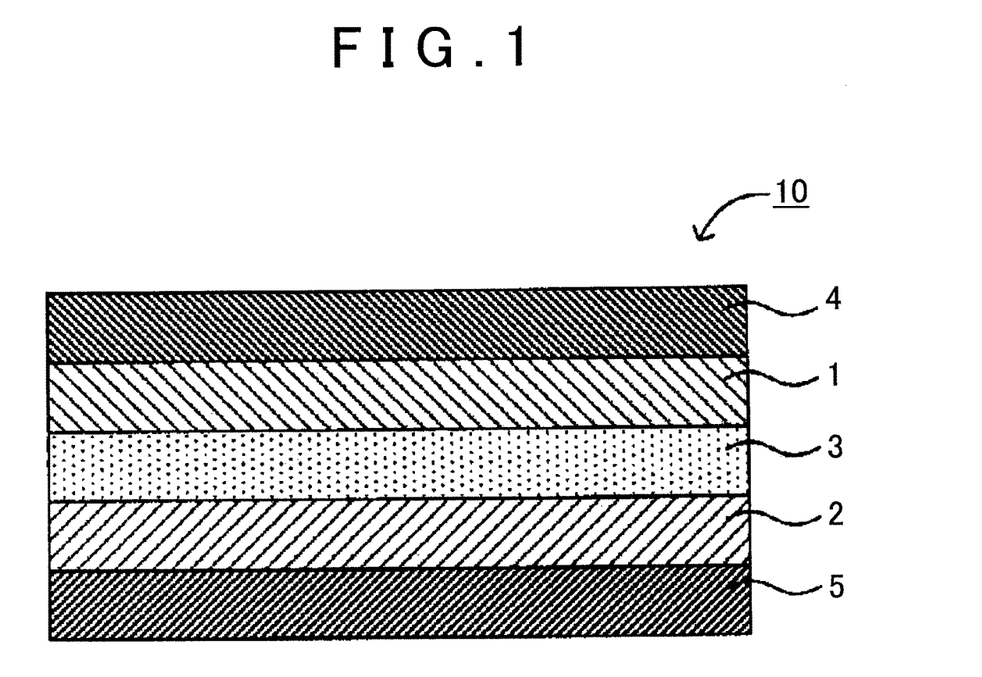
FIG. 1 shows a schematic cross-sectional view of one example of a lithium solid battery according to an embodiment of the present invention.

FIG. 1 shows a schematic cross-sectional view of one example of the lithium solid battery according to this embodiment. The lithium solid battery 10 shown in FIG. 1 includes the positive electrode active substance layer 1 containing the positive electrode active substance, the negative electrode active substance layer 2 containing the negative electrode active substance, the solid electrolyte layer 3 formed between the positive electrode active substance layer 1 and the negative electrode active substance layer 2, a positive electrode current collector 4 for current collection of the positive electrode active substance layer 1, and a negative electrode current collector 5 for current collection of the negative electrode active substance layer 2. According to this embodiment, the sulfide solid electrolyte material abovementioned in "A. sulfide solid electrolyte material" is contained in at least one of the positive electrode active substance layer 1, the negative electrode active substance layer 2 and the solid electrolyte layer 3.

According to this embodiment, with use of the sulfide solid electrolyte material mentioned above, it is possible to provide the lithium solid battery exhibiting high Li ion conductivity, and achieve high output of the battery. Hereafter, explanations are given as to the lithium solid battery according to this embodiment for each configuration.

1. Positive Electrode Active Substance Layer

First, the positive electrode active substance layer according to this embodiment will be described. The positive electrode active substance layer according to this embodiment contains at least the positive electrode active substance, and may further contain at least one of a solid electrolyte material, an electrically conductive material and a binder, as appropriate.

According to this embodiment, the solid electrolyte material contained in the positive electrode active substance layer is preferably the sulfide solid electrolyte material abovementioned in "A. sulfide solid electrolyte material". The content of the sulfide solid electrolyte material in the positive electrode active substance layer is preferably within a range of 0.1 vol % to 80 vol %, for example, more preferably within a range of 1 vol % to 60 vol %, and particularly preferably within a range of 10 vol % to 50 vol %.

The positive electrode active substance is not limited to a particular one, and can be exemplified by rock salt layer-like active substances such as $LiCoO_2$, $LiMnO_2$, $LiNiO_2$, $LiVO_2$, $LiNi_{1/3}Co_{1/3}Mn_{1/3}O_2$ and the like, spinel type active substances such as $LiMn_2O_4$, $Li(Ni_{0.5}Mn_{1.5})O_4$ and olivine type active substance such as $LiFePO_4$, $LiMnPO_4$, $LiNiPO_4$, $LiCuPO_4$. Si containing oxide such as $Li_2FeSiO_4$ and $Li_2MnSiO_4$ may be used for the positive electrode active substance.

The shape of the positive electrode active substance can be exemplified by particle shape, and is preferably spherical shape or oval spherical shape. When the positive electrode active substance has a particle-like shape, the average diameter is preferably within a range of 0.1 µm to 50 µm, for example. The content of the positive electrode active substance in the positive electrode active substance layer is preferably within a range of 10 vol % to 99 vol %, for example, and more preferably 20 vol % to 99 vol %.

The positive electrode active substance layer according to this embodiment may contain at least one of the electrically conductive material and the binder in addition to the positive electrode active substance and the solid electrolyte material. The electrically conductive material can be exemplified by acetylene black, Ketjen black, carbon black, carbon fiber, and the like. The binder can be exemplified by a fluorine containing binder such as PTFE, PVDF and the like. Thickness of the positive electrode active substance layer is preferably within a range of 0.1 µm to 1000 µm, for example.

2. Negative Electrode Active Substance Layer

Next, the negative electrode active substance layer according to this embodiment will be described. The negative electrode active substance layer according to this embodiment contains at least the negative electrode active substance, and may further contain at least one of the solid electrolyte material, the electrically conductive material and the binder, as appropriate.

According to this embodiment, the solid electrolyte material contained in the negative electrode active substance layer is preferably the sulfide solid electrolyte material abovementioned in "A. sulfide solid electrolyte material". The content of the sulfide solid electrolyte material in the negative electrode active substance layer is preferably within a range of 0.1 vol % to 80 vol %, for example, more preferably within a range of 1 vol % to 60 vol %, and particularly preferably within a range of 10 vol % to 50 vol %.

The negative electrode active substance can be exemplified by a metal active substance, and a carbon active substance. The metal active substance can be exemplified by In, Al, Si and Sn. The carbon, active substance can be exemplified by meso carbon microbeads (MCMB), highly oriented pyrolytic graphite (HOPG), hard carbon, soft carbon and the like. The content of the negative electrode active substance in the negative electrode active substance layer is preferably within a range of 10 vol % to 99 vol %, for example, and more preferably 20 vol % to 99 vol %. The electrically conductive material and the binder are the same materials abovementioned in the positive electrode active substance layer. Thickness of the negative electrode active substance layer is preferably within a range of 0.1 µm to 1000 µm, for example.

3. Solid Electrolyte Layer

Next, explanations are given as to the solid electrolyte layer according to this embodiment. The solid electrolyte layer according to this embodiment is formed between the positive electrode active substance layer and the negative electrode active substance layer, and formed of the solid electrolyte material. The solid electrolyte material contained in the solid electrolyte layer is not limited to a particular one, if having Li ion conductivity.

According to this embodiment, the solid electrolyte material contained in the solid electrolyte layer is preferably the sulfide solid; electrolyte material abovementioned in "A. sulfide solid electrolyte material". The content of the sulfide solid electrolyte material in the solid electrolyte layer is not limited to a particular range if having a predetermined insulation property, but is preferably within a range of 10 vol % to 100 vol %, for example, more preferably within a range of 50 vol % to 100 vol %. In particular, the solid electrolyte material is formed of only the abovementioned sulfide solid electrolyte material.

The solid electrolyte layer may contain the binder, for achieving a solid electrolyte layer with flexibility. The binder can be exemplified by a fluorine containing binder such as PTFE and PVDF. Thickness of the solid electrolyte layer is preferably within a range of 0.1 µm to 1000 µm, for example, more preferably within a range of 0.1 µm to 300 µm.

4. Other Components

The lithium solid battery according to this embodiment includes at least the positive electrode active substance layer, the negative electrode active substance layer, and the solid electrolyte layer mentioned above. Besides, in general, the lithium solid battery according to this embodiment includes the positive electrode current collector for current collection of the positive electrode active substance layer, and negative electrode current collector for current collection of the negative electrode active substance layer. The material of the positive electrode current collector can be exemplified by SUS, aluminum, nickel, iron, titan, carbon and the like, and is preferably SUS. Meanwhile, the material of the negative electrode current collector can be exemplified by SUS, copper, nickel, carbon and the like, and is preferably SUS. The thicknesses, shapes and the like of the positive electrode current collector and the negative electrode current collector are preferably selected according to the use of the lithium solid battery. According to this embodiment, a general case of lithium solid battery may be used for a battery case according to this embodiment. The battery case can be exemplified by SUS battery case and the like.

5. Lithium Solid Battery

The lithium solid battery according to the embodiment may be a primary battery or a secondary battery, and preferably a secondary battery for repetitively charging and discharging and being utilized as a vehicle-loaded battery. The shape of the lithium solid battery according to the embodiment can be exemplified by coin type, laminate type, tubular type, rectangular type and the like.

The fabrication method of the lithium solid battery according to this embodiment is not limited to a particular one if providing the abovementioned lithium solid battery, and may be the same method as that of general lithium solid battery. As one example of the fabrication method, the lithium solid battery can be fabricated by pressing a material forming the positive electrode active substance layer, a material forming the solid electrolyte layer and a material forming the negative electrode active substance layer in this order; preparing power generating elements; accommodating the power generating elements within the battery case; and swaging the battery case.

C. Preparation Method of the Sulfide Solid Electrolyte Material

Next, explanations are given as to a method of preparing the sulfide solid electrolyte material according to this embodiment. The preparation method of the sulfide solid electrolyte material is the preparation method abovementioned in "A. sulfide solid electrolyte material", and includes an amorphization step of performing mechanical milling to a mixture of a raw material composition and the above organic compound to convert the raw material composition to an amorphous state, thereby a sulfide glass is synthesized; and a drying step of drying the sulfide glass with the organic compound remaining.

Figure 2:
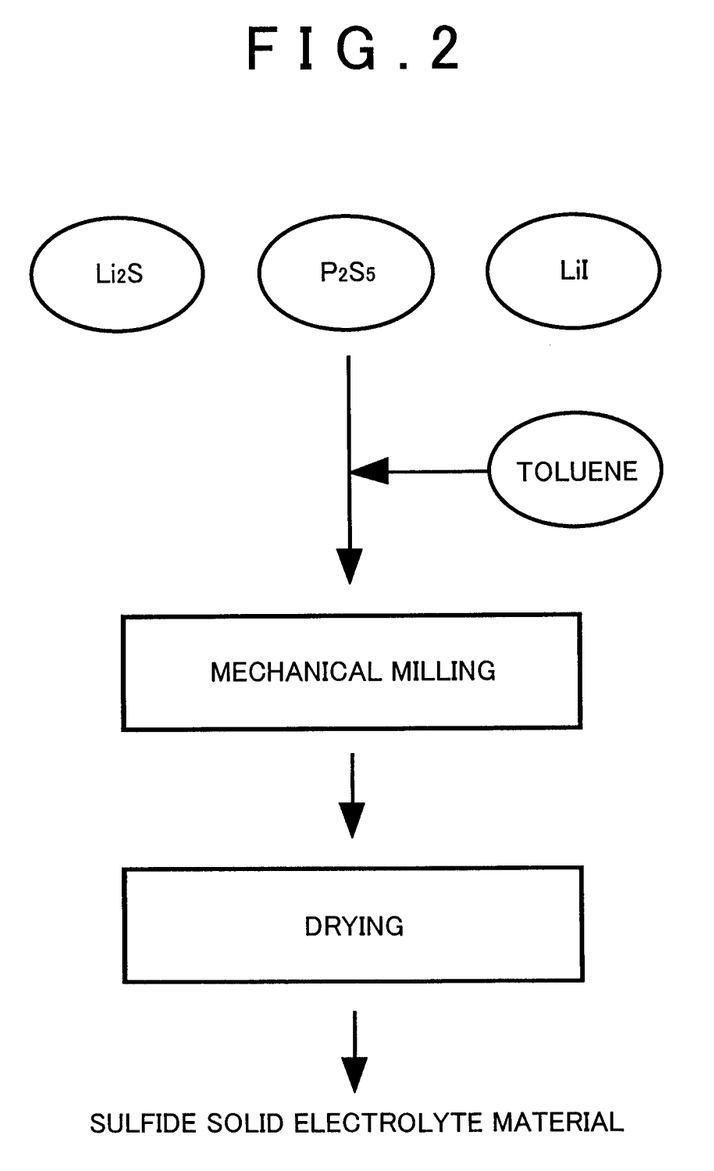
FIG. 2 shows a flowchart indicating one example of a method of preparing the sulfide solid electrolyte material according to the embodiment of the present invention.

FIG. 2 shows a flowchart indicating one example of the method of preparing the sulfide solid electrolyte material according to this embodiment. In FIG. 2, first, a raw material composition containing $Li_2S$, $P_2S_5$ and LiI is prepared. Next, the sulfide glass is synthesized by adding toluene to the raw material composition and performing mechanical milling. Next, the sulfide glass is dried such that the organic compound remains.

According to this embodiment, the sulfide glass is dried such that the organic compound remains for providing the sulfide solid electrolyte material exhibiting high Li ion conductivity. Hereafter, explanations are given as to a method of preparing the sulfide solid electrolyte material according to this embodiment for each step.

1. Amorphization Step

The amorphization step according to this embodiment is a step of performing mechanical milling to the mixture of the raw material composition and the organic compound for amorphization of the raw material composition and synthesis of the sulfide glass.

Herein, explanations are omitted as to the raw material composition and the organic compound, as the same material abovementioned in "A. sulfide solid electrolyte material" can be applied. The content ratio of the raw material composition and the organic compound is not limited to a particular range. When the raw material composition is one weight part, the organic compound preferably has a content ratio within a range of 0.5 weight part to 10 weight part, for example, more preferably within a range of 1 weight part to 5 weight part.

The method of amorphizing the raw material composition can be exemplified by mechanical milling and melt quenching method, and is preferably mechanical milling for enabling to perform treatment in ordinary temperature and simplify the fabrication process. The melt quenching method is limited as to reaction atmosphere and reaction container, while the mechanical milling is advantageous for easily synthesizing the sulfide glass having a predetermined composition. The mechanical milling may be dry mechanical milling or wet mechanical milling, but is preferably the latter for preventing the raw material composition from adhering on wall surfaces of the container and so on as well as providing a sulfide glass exhibiting high amorphous property.

The mechanical milling is not limited to a particular one if referring to a method of mixing with the raw material composition while adding mechanical energy. The mechanical milling can be exemplified by ball mill, vibration mill, turbo mill, mechanofusion, disk mill and the like. The mechanical milling is preferably ball mill, particularly preferably planetary ball mill for providing a desired sulfide glass efficiently.

Each setting for the mechanical milling is determined to provide a desired sulfide glass. For example, when utilizing planetary ball mill, it is possible to make treatment under a predetermined rotational speed and a time of rotation by adding the raw material composition and crushing ball into the container. Generally, with increasing the speed of rotation, the rate of sulfide glass generation increases. With increasing the time for treatment, the rate of transition from the raw material composition to the sulfide glass increases. When utilizing planetary ball mill, the rotation speed of base table is preferably within a range of 200 rpm to 500 rpm, for example, and more preferably within a range of 250 rpm to 400 rpm. When utilizing planetary ball mill, for example, the treatment time is preferably within a range of 1 hour to 100 hours, and more preferably within a range of 1 hour to 50 hours. Materials of container and crushing ball for ball milling can be exemplified by $ZrO_2$ and $Al_2O_3$. The diameter of the crushing ball is within a range of 1 mm to 20 mm, for example.

2. Drying Step

Next, explanations are given as to the drying step according to this embodiment. The drying step according to this embodiment is the step of drying the sulfide glass with the organic compound remaining. The drying step makes it possible to provide the sulfide glass with a desired content range of the organic compound, for example.

The method of drying the sulfide glass is not limited to a particular one, and can be exemplified by heat drying, low pressure drying (including vacuum drying) and a combination of these methods. The heat drying temperature is preferably a boiling point of the organic compound or higher. The heat drying temperature is preferably less than a crystallizing temperature of the sulfide glass in order to provide the sulfide glass. The crystallizing temperature of the sulfide glass can be determined based on differential thermal analysis (DTA). Meanwhile, the heat drying temperature is not limited to a particular range, and is 100° C.

or more, for example, and preferably 110° C. or more. The heat drying temperature is not limited to a particular range, and is 160° C. or less, for example, and preferably 140° C. or less.

The drying time is not limited to a particular range if a desired sulfide glass can be provided, and is preferably within a range of 1 minute to 24 hours, for example. The drying step is preferably performed at inert gas atmosphere (for example, Ar gas atmosphere) for preventing degradation (e.g., oxidation) of the sulfide glass. The heat drying method can be exemplified by a method utilizing hot plate, drying furnace, or electric furnace.

The drying step according to this embodiment may be a step of heating the sulfide glass at a crystallization temperature or more to synthesize a glass ceramics. In this instance, drying (thermal treatment) is performed so as to keep the organic compound remaining, for providing the glass ceramic with a desired content range of the organic compound.

The thermal treatment temperature is generally the crystallization temperature of the sulfide glass or more. The thermal treatment temperature is not limited to a particular range if having a crystallization temperature or more, and is preferably 160° C. or more, for example. Meanwhile, the maximum of the thermal treatment temperature is not limited to a particular range if a desired glass ceramics can be synthesized, and varies slightly depending on the composition of the sulfide glass. The maximum of the thermal treatment temperature is nearly 200° C., for example, for synthesizing the glass ceramics.

The thermal treatment time is not limited to a particular range if a desired glass ceramics can be provided, and is preferably within a range of 1 minute to 24 hours, for example. The thermal treatment is preferably performed at inert gas atmosphere (for example, Ar gas atmosphere) for preventing degradation (e.g., oxidation) of the glass ceramics. The thermal treatment step may be performed at open environment or tightly closed environment, but is preferably performed at a tightly closed environment for preventing volatilization of the organic compound. The thermal treatment method is not limited to a particular one, and can be exemplified by a method utilizing hot plate, drying furnace, or electric furnace.

The present invention is not limited to the above embodiment.

Hereafter, the present invention will be explained specifically with reference to examples. Any manipulation for weighing, synthesizing and drying was performed in Ar atmosphere, except as specifically explained.

EXAMPLE 1

Lithium sulfide (Li$_2$S, purity: 99.9%, available from Nippon chemical industrial Co., Ltd.), phosphorus pentasulfide (P$_2$S$_5$, purity: 99%, available from Sigma-Aldrich Co. LLC), and lithium iodide (LiI, purity: 99%, available from Sigma-Aldrich Co. LLC) were employed as starting, materials. Next, Li$_2$S and P$_2$S$_5$ were weighed to achieve that a molar ratio of Li$_2$S to P$_2$S$_5$ is 75 to 25 (Li$_3$PS$_4$, ortho composition). Next, LiI was weighed to achieve a LiI ratio of 30 mol %. The weighed starting material 2 g, dehydrous heptane 4 g (water content: 30 ppm or less) and ZrO$_2$ ball (Φ=5 mm, 53 g) were supplied into a container (45 cc, made of ZrO$_2$) of planetary ball mill, and then the container was fully closed tightly. The container was attached to a planetary ball mill machine (available from Fritsch Co., Ltd. P7), and then mechanical milling was performed for 1 hour at intervals of 15 minutes repetitively 40 times at 500 rpm of the rotation speed of base table. The resultant sample was dried at 120° C. for ten hours using hot plate to eliminate heptane for providing a sulfide glass. The molar composition of the resultant sulfide glass is xLiI.(100−x) (0.75Li$_2$S.0.25P$_2$S$_5$), in which x equals to 30.

EXAMPLES 2 TO 5 AND COMPARATIVE EXAMPLE 1

The sulfide glass was obtained in the same way as described in example 1, except that drying temperature and dying time were modified in accordance with Table 1.

COMPARATIVE EXAMPLE 2

Mechanical milling was performed in the same way as described in Example 1 for obtaining the sulfide glass, except that dehydrous heptane glass was not used. Then, the sulfide glass was obtained without drying.

[Evaluation]
(Measurement of Residual Organic Compound Content)

Measurement of residual organic compound content was performed for samples of examples 1 to 5 and comparative example 1. Specifically, sample powder 0.01 g was taken, and heated at 250° C. for 60 minutes under Ar gas atmosphere to generate gas. The gas component was collected into an adsorption tube, and subjected to thermal desorption GC/MS analysis. Ar gas (flow rate: 50 mL/min) was employed as a carrier gas, and Tenax GR was employed as an adsorption tube. TD-100 (available from Markers Inc.) was employed as a thermal desorption apparatus. HP7890/5975C (available from Agilent Inc.) was employed for GC/MS analysis. For GC/MS measurement, DB-5MS (30 m×0.25 mm ID, film thickness: 1.0 μm, JW Inc.) was employed as a column. He gas (flow rate: 1.5 mL/min) was employed as a carrier gas. Toluene was employed as a standard gas. Table 1 shows the results.

(Li Ion Conductivity Measurement)

Li ion conductivity measurement (ordinary temperature) was performed for samples of examples 1 to 5 and comparative examples 1 to 2 by alternating current impedance method. Li ion conductivity measurement was performed as described below. First, a pellet with a cross-sectional area of 1 cm$^2$ and thickness of 0.5 mm was prepared with use of sample powder. Then, the pellet was pressed under 4.3 ton/cm$^2$ of pressure, and subjected to Li ion conductivity measurement by alternating current impedance method. Table 1 and FIG. 3 show the results.

TABLE 1

| | Drying temperature (° C.) | Drying time (h) | Residual organic compound content (wt %) | Li ion conductivity (S/cm) |
|---|---|---|---|---|
| Example 1 | 120 | 10 | 0.4156 | 8.8 × 10$^{-4}$ |
| Example 2 | 120 | 2 | 0.5446 | 8.7 × 10$^{-4}$ |
| Example 3 | 110 | 10 | 0.5498 | 8.7 × 10$^{-4}$ |
| Example 4 | 110 | 2 | 0.5746 | 8.6 × 10$^{-4}$ |
| Example 5 | 110 | 0.5 | 0.6037 | 8.1 × 10$^{-4}$ |
| Comparative example 1 | 60 | 2 | 0.825 | 6.9 × 10$^{-4}$ |
| Comparative example 2 | — | — | 0 | 4.4 × 10$^{-4}$ |

Figure 3:
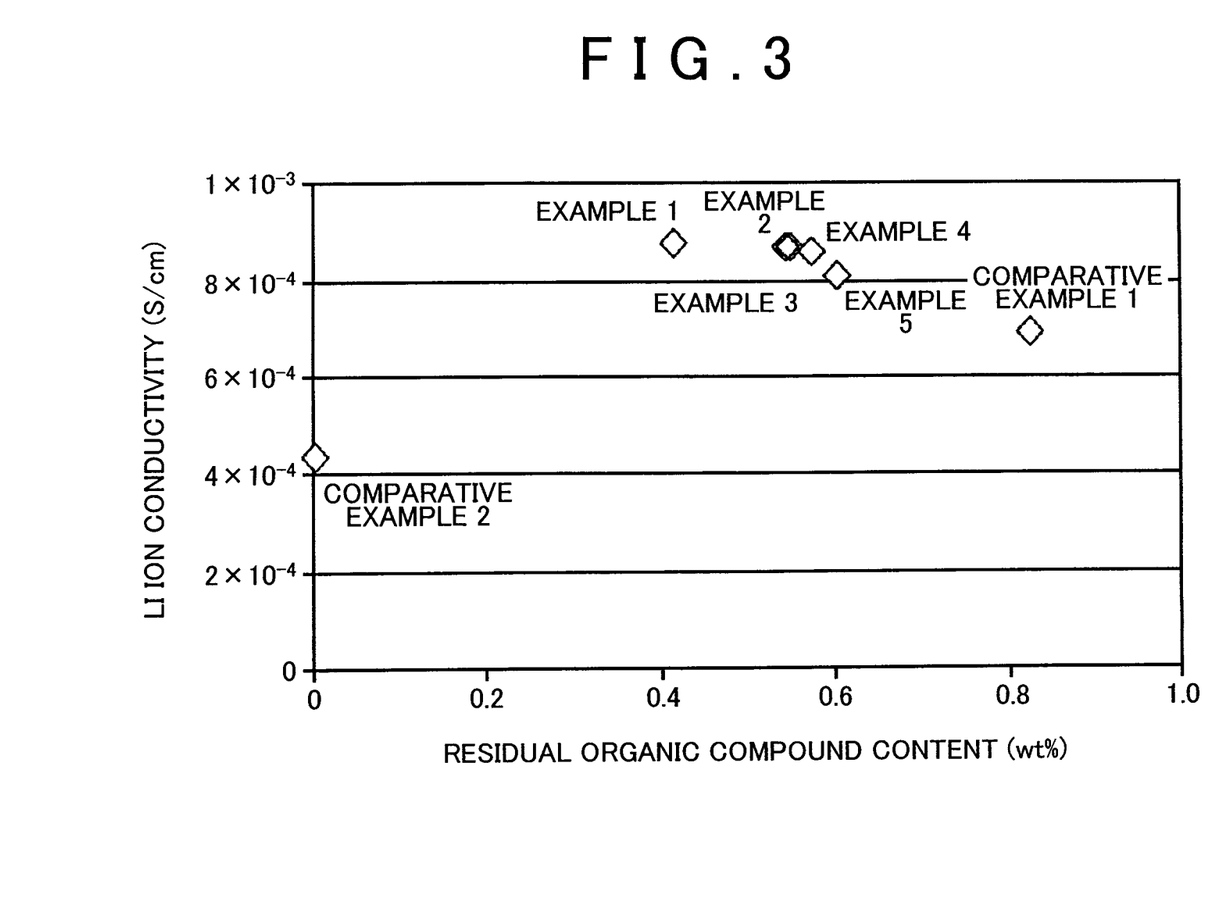
FIG. 3 shows measurement results of Li ion conductivity for sulfide solid electrolyte materials in examples 1-5 and comparative example 1-2.

As shown in Table 1 and FIG. 3, examples 1 to 5 exhibit higher Li ion conductivities than comparative examples 1 to 2. Comparative example 2 exhibits lower. Li ion conductivity presumably due to large springback between particles of the solid electrolyte material in press molding negatively affecting formation of interface between particles. Meanwhile, in comparative example 1, the organic compound may prevent Li ion conductivity physically.

What is claimed is:

1. A sulfide solid electrolyte material exhibiting a Li ion conductivity comprising an aprotic organic compound having a molecular weight within a range of 30 to 300,
   wherein the aprotic organic compound has a content of from 0.4 to 0.65 wt % based on an amount of the sulfide solid electrolyte material, and
   wherein the sulfide solid electrolyte material contains S element, Li element and at least one of elements selected from a group consisting of P, Si, Ge, Al and B elements.

2. The sulfide solid electrolyte material according to claim 1, wherein the sulfide solid electrolyte material further contains a halogen element.

3. The sulfide solid electrolyte material according to claim 1, wherein the molecular weight of the aprotic organic compound is within a range of 60 to 200.

4. The sulfide solid electrolyte material according to claim 1, wherein the aprotic organic compound is liquid at 25° C.

5. The sulfide solid electrolyte material according to claim 1, wherein the sulfide solid electrolyte material is a sulfide glass.

6. A lithium solid battery comprising;
   a positive electrode active substance layer containing a positive electrode active substance;
   a negative electrode active substance layer containing a negative electrode active substance; and
   a solid electrolyte layer formed between the positive electrode active substance layer and the negative electrode active substance layer, wherein at least one of the positive electrode active substance layer, the negative electrode active substance layer and the solid electrolyte layer contains the sulfide solid electrolyte material according to claim 1.

7. A method of preparing the sulfide solid electrolyte material according to claim 1, comprising;
   an amorphization step of performing mechanical milling to a mixture of a raw material composition and the organic compound to convert the raw material composition to an amorphous state, thereby a sulfide glass is synthesized; and
   a drying step of drying the sulfide glass with the organic compound remaining.

8. The method according to claim 7, wherein the sulfide glass is dried in a range between 110° C. and 140° C. in the drying step.

* * * * *